Jan. 23, 1951 R. E. YATES ET AL 2,538,952
GASEOUS FUEL BURNER AND CONTROL THEREFOR
Filed Nov. 12, 1947 6 Sheets-Sheet 1

Fig.1

Inventors:
Robert E. Yates
Joseph M. Engel
William W. Riesche
By Wallace and Cauur
Attorneys Jan. 23, 1951  R. E. YATES ET AL  2,538,952
GASEOUS FUEL BURNER AND CONTROL THEREFOR
Filed Nov. 12, 1947  6 Sheets-Sheet 2

Fig. 2.

Inventors:
Robert E. Yates
Joseph M. Engel
William W. Riesche
By Wallace and Cannon
Attorneys

Jan. 23, 1951     R. E. YATES ET AL     2,538,952

GASEOUS FUEL BURNER AND CONTROL THEREFOR

Filed Nov. 12, 1947     6 Sheets-Sheet 4

Inventors:
Robert E. Yates
Joseph M. Engel
William H. Kresche
By Wallace and Cannon
Attorneys Patented Jan. 23, 1951

2,538,952

UNITED STATES PATENT OFFICE 2,538,952

GASEOUS FUEL BURNER AND CONTROL THEREFOR

Robert E. Yates, Joseph M. Engel, and William W. Riesche, Chicago, Ill., assignors to Drying Systems, Inc., Chicago, Ill., a corporation of Illinois Application November 12, 1947, Serial No. 785,488

7 Claims. (Cl. 158—99)

This invention relates to gas burners and the safety control thereof, and particularly it relates to such burners that are adapted for safe operation in a rapidly moving current of air.

Where gas burners are used for ordinary purposes, the air supply that moves past the burner is, in most instances, maintained at the absolute minimum that is consistent with attainment of complete combustion of the gaseous fuel, but where such burners are utilized in drying apparatus such, for example, as domestic clothes driers, it is desirable that the gas burner be placed directly in the path of the rapidly moving current of air that is forced through the clothes drier so as to thereby heat such air. In the past it has been impossible to attain this desirable location of a gas burner in a rapidly moving current of air that is required in a clothes drier or the like, and as a result, in those driers equipped with electrical heating means, the cost of operation of which has been objectionably high. It is, therefore, an important object of the present invention to enable a gas burner to be safely utilized when disposed in a rapidly moving current of air such as the air that is forced through a clothes drier or the like, and an object related to the foregoing is to enable this to be accomplished with a gas burner of extremely simple construction. A further and related object of the present invention is to provide a gas burner that will operate safely and efficiently when disposed in the path of a rapidly moving current of air, and a related object is to provide such a burner and control assembly that is unitary in its arrangement so that it may be readily placed in the air supply duct of a domestic clothes drier or the like to heat the air passing through such duct.

It will be evident, of course, that where a gas burner is utilized in a domestic clothes drier, the operation of such burner must be rendered extremely safe, and it is a further object of the present invention to provide control means for such burners so that such safe operation may be attained. A related object is to provide a control means operating on an electronic principle, and so constructed and arranged that it may be economically utilized in controlling the gas burner of a domestic clothes drier or the like.

Other and further objects of the present invention will be apparent from the following description and claims and are illustrated in the accompanying drawings which, by way of illustration, show a preferred embodiment, and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

For purposes of disclosure, the invention is herein illustrated as embodied in a burner and control unit 10 that is incorporated as the heating means in a domestic clothes drier unit 11. The clothes drier 11 that is herein shown is somewhat similar in its general arrangement to the clothes drier shown in Broglie Patent No. 2,424,737, patented July 29, 1947, and this drier includes a casing 12, the upper front wall of which includes an upwardly and rearwardly sloping portion 12S, and in this sloping portion 12S a loading opening 13 is afforded so that clothes may be inserted downwardly and rearwardly through an aligned loading chute 14 to fall into a rotatably and generally cylindrical drying drum 15 that is disposed within the casing 12. The drum 15 is supported primarily on a bearing structure 16 carried on the rear wall of the casing 12, and this drum has a relatively large forward opening 17 that is aligned with the chute 14. Vanes 15V disposed at spaced points and in inwardly extending radial positions within the drum serve to assure an efficient tumbling action of the clothes as the drum rotates.

Figure 1:
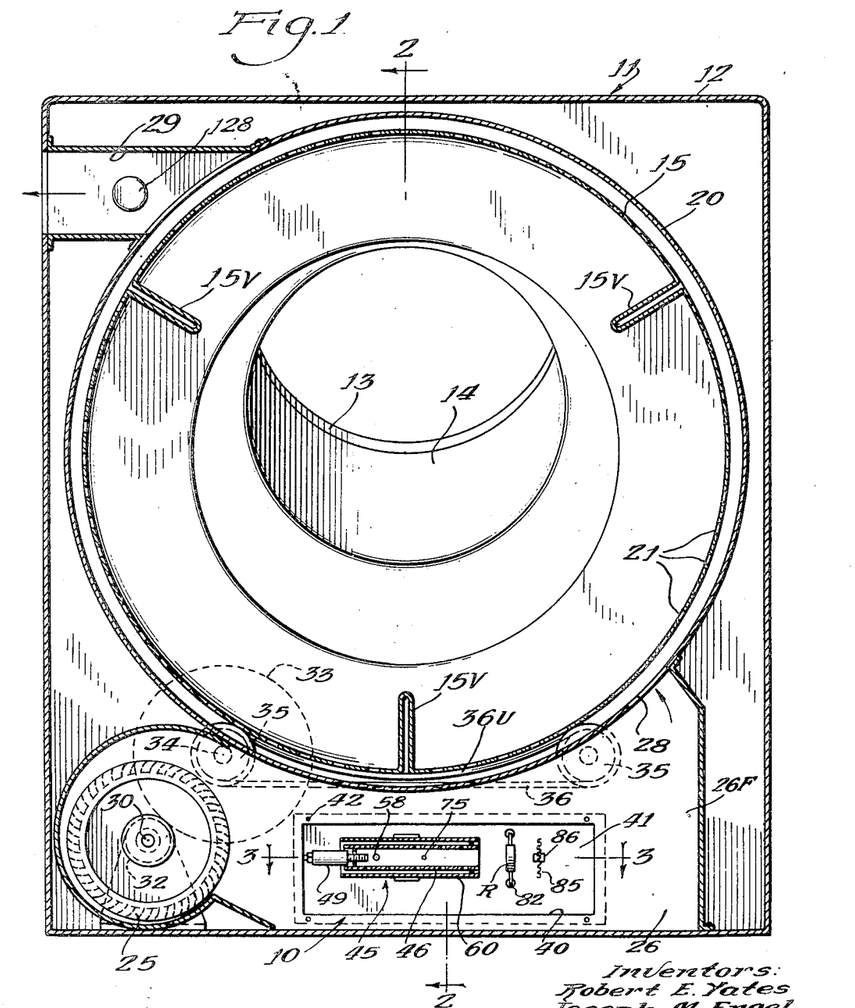
Fig. 1 is a vertical sectional view illustrating one form of domestic clothes drier in which the gas burner of the present invention has been incorporated.
Figure 2:
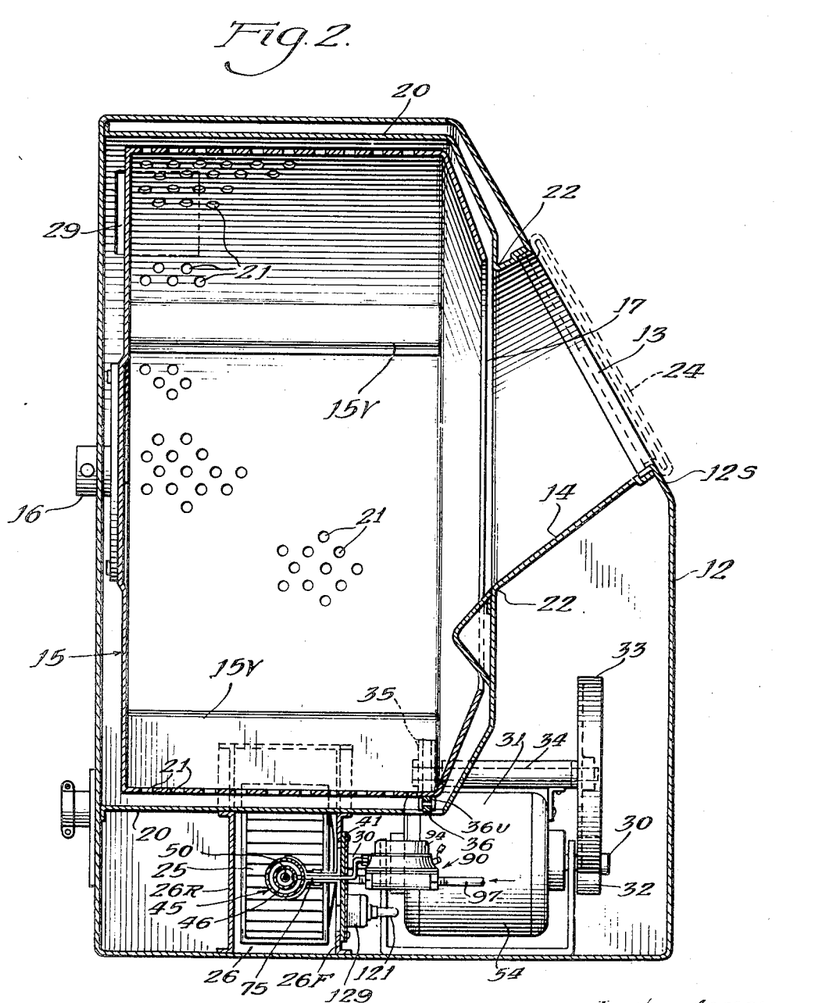
Fig. 2 is a vertical sectional view taken substantially along the line 2—2 of Fig. 1, and illustrates further details of the burner and the manner of its association with the clothes drier.

Within the casing 12 and in outwardly spaced relationship with respect to the cylindrical walls of the drum 15, a stationary inner housing 20 is afforded so that drying air may be forced into and confined within the inner housing 20 as it passes through and about the drum 15. Such air is heated as will hereinafter be described and is circulated about the drum 15 and into the drum through perforations 21 that are afforded in the cylindrical wall of the drum. The inner housing 20 is sealed or connected as at 22 to the inner end of the chute 14 so that the drying air will be properly confined and such drying air may, of course, pass into the chute 14 but is normally retained therein by a door 24 that may be placed over the loading opening 13 during the drying operation. The drying air is supplied to the inner housing 20 by a blower 25 that is mounted on a horizontal axis within the casing 12 at the inlet of a horizontal duct 26 that is formed within the casing 12 and beneath the lower wall of the inner housing 20. It is within this duct 26 that the burner unit 10 is mounted, and the drying air is forced from the fan or blower 25 past the burner unit 10 and then upwardly at the right hand end of the duct 26, as viewed in Fig. 1, and into the inner housing 20 through an inlet opening 28. Such air is thus heated by the burner unit 10 and passes through and about the drum 15 and then is forced out of the inner housing 20 through an outlet duct 29.

The fan 25 has the rotary element thereof mounted on the extended motor shaft 30 of an electric motor 31 that is mounted within the casing 12 beneath the chute 14. This motor 31 also serves to impart rotative movement to the drying drum 15 and this is accomplished through a frictional drive that includes a friction wheel 32 on the other end of the shaft 30, a frictional wheel 33 engaging the friction wheel 32, a shaft 34 upon which the wheel 33 is mounted, and a pair of pulleys 35. The two pulleys 35 are supported so as to be disposed beneath the forward edge of the drum 15, and on opposite sides of a vertical plane passing through the axis of the drum. One of the pulleys is supported in such a way that the upper run 36U of the belt frictionally engages and supports the forward edge portion of the drum 15, thereby to drive the drum.

The duct or passage 26 through which the drying air is forced by the fan 25 is formed at its lower side by the lower wall of the casing 12 while the upper wall of this passage is afforded by the lower wall of the inner casing 20. Between such upper and lower walls, a rear wall 26R and a front wall 26F are extended so as to thus define the air passage 26, and the burner and control unit 10 is placed in position within the passage 26 through a relatively large clearance opening 40 that is formed in the front wall 26F of the passage. Under the present invention the unit 10 is assembled on and carried by a mounting plate assembly 41 which preferably comprises an outer metal plate 41M and a relatively thick inner or rear plate 41P formed from an electric insulating material. The plate assembly 41 serves to cover the opening 40, and the mounting plate assembly 41 is removably secured in position by means such as screws 42.

Figure 3:
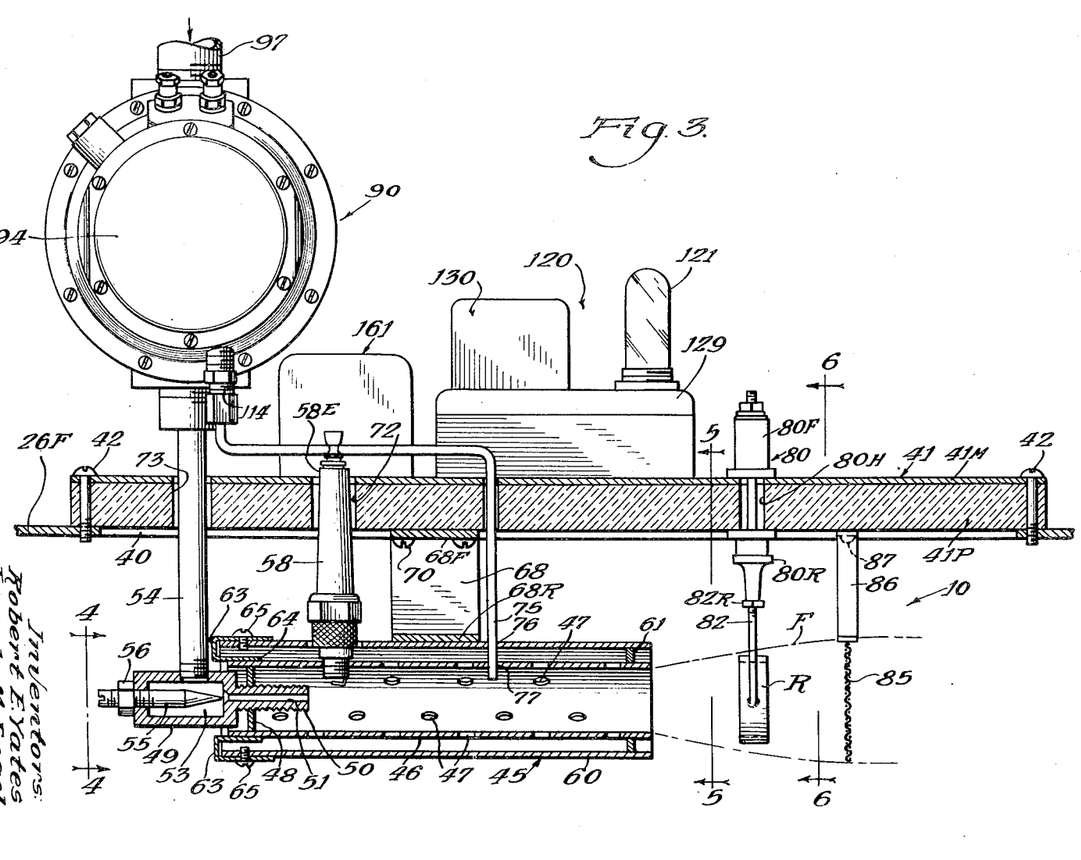
Fig. 3 is a plan section taken substantially along the line 3—3 of Fig. 1 and illustrating the burner and a part of the control means on an enlarged scale.
Figure 4:
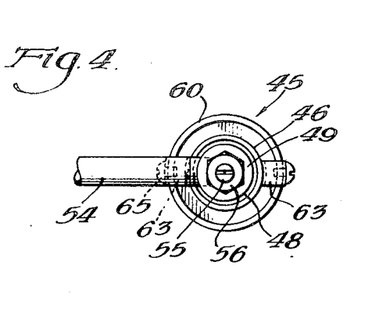
Fig. 4 is a view taken from the line 4—4 in Fig. 3 and illustrating the rear or inlet end of the burner.

The burner unit 10 includes a burner structure 45 that is shown in detail in Figs. 3 to 6 of the drawings, and as there shown, the burner unit 45 includes an elongated cylindrical burner tube 46 having a plurality of air inlet openings 47 formed therein and spaced thereabout and throughout the length of the burner tube. At its rear or left hand end as viewed in Fig. 3, the burner tube 46 has a cross wall 48 secured therein as by welding, and a gas supply fitting 49 has an elongated nipple 50 formed thereon and threaded through the cross wall 48. The nipple 50 has an elongated passage 51 formed axially therethrough and at its rear or left hand end, and as shown in Fig. 3, this passage 51 opens into a relatively large chamber 53 that is formed in the fitting 49. Gas is supplied to the chamber 53 through a pipe 54, and the rate of discharge through the passage 51 and into the burner tube 46 is governed by an adjustable needle valve 55 which may be held in adjusted position by a lock nut 56.

Figure 7:
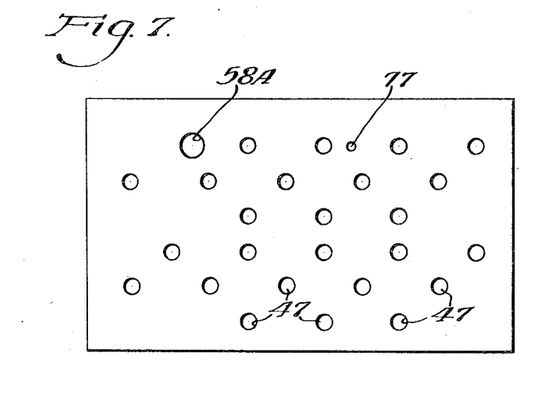
Fig. 7 is a developed view illustrating the arrangement and proportions of the air inlet and other openings of the main burner.

For the purpose of igniting the fuel that is thus supplied to the burner tube 46, a spark plug 58 is threaded into an opening 58A, Fig. 7, in the tube 46 just ahead of or to the right of the discharge end of the fuel passage 51, and this spark plug 58 is energized as will hereinafter be described when the burner 45 is to be lighted.

In order that the burner 45 may operate safely and efficiently within the rapidly moving current of air in the duct 26, an air control sleeve 60 is operatively associated with the burner tube 46 so as to control and direct the supply of air to the burner tube 46. The control sleeve 60 is somewhat larger than the sleeve 46 so as to be spaced radially therefrom, and at its forward end, and at the right in Fig. 3, with respect to the openings 47, an annular closure wall 61 is disposed between the two sleeves 46 and 60 so as to maintain the same in concentric relation while at the same time preventing right hand or forward discharge of air from the space between the two right hand ends of the sleeves 46 and 60. At the rear or left hand ends of the sleeves or tubes 46 and 60 the desired supporting connection is afforded by a pair of relatively narrow metal brackets 63 that are of a U-shaped form. These brackets are disposed at diametrically opposite points, and one arm of each bracket is secured as by welding at 64 to the burner tube 46. The other arms of the brackets 63 are arranged to engage opposite outside faces of the control sleeve 60, and are secured to the sleeve 60 by means such as screws 65.

Figure 5:
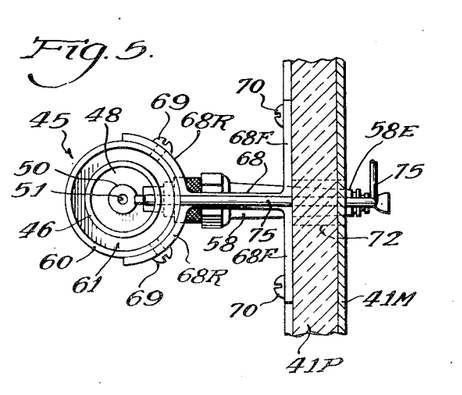
Fig. 5 is a fragmentary sectional view taken along the line 5—5 of Fig. 3 and illustrating the outlet end of the burner.
Figure 6:
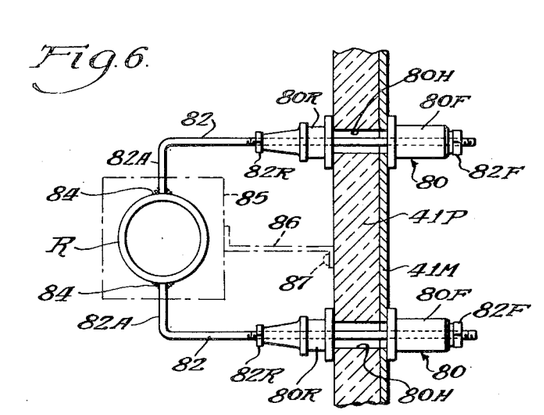
Fig. 6 is a plan section taken along the line 6—6 of Fig. 3.

The assembly that is thus afforded is supported on the rear or the inner face of the mounting plate assembly 41 by a rearwardly projecting bracket 68 which has rearwardly projecting arms 68R that are of arcuate shape so as to embrace the air control sleeve 60, and these arms are secured to the control sleeve by means such as screws 69. The bracket 68 has forward arms 68F that are secured against the inner or rear face of the mounting plate assembly 41 by means such as screws 70. It will be observed in this connection that the burner 45 is supported on the mounting plate 41 so that the axis of the burner is substantially horizontal and the relationship is such that the end 58E of the spark plug 58 extends through an opening 72 in the mounting plate assembly 41 so that this end 58E of the spark plug is available for the attachment of the necessary electrical connection thereto. Further-more, the supply pipe 54 through which gas is supplied to the burner extends forwardly through the opening 73 in the mounting plate assembly 41, and as will become apparent as the description proceeds, this enables the control means to be assembled on the forward face of the plate assembly 41 so that the unit may be put in position by rearward movement of the plate assembly 41 into such a position that the mounting plate assembly 41 covers the opening 40 in the supply duct 26. In Figs. 3 and 5 of the drawings, it will be observed that a relatively small vent pipe 75 is extended through the mounting plate 41 and through openings 76 and 77 in the sleeves 60 and 46 respectively, and the function of this vent pipe will hereinafter be apparent.

In the use of a gas burner in installations such as a domestic clothes drier, it is essential that complete or substantially complete combustion be attained, and it is also essential that safety control means be afforded for shutting off the gas supply in the event of a flame failure. In the accomplishment of these two essential functions, the burner unit 10 of the present invention has means mounted on the inner or rear face of the plate assembly 41 in positions where they will cooperate with a flame F or with the gaseous fuel that issues from the burner 45 as indicated in dotted outline in Fig. 3. Thus in Figs. 3 and 6, it will be evident that a pair of insulating mounting structures 80 are afforded at vertically spaced points so as to extend through the mounting plate assembly 41 just forwardly or to the right of the right hand end of the burner 45. Each structure 80 comprises a pair of elongated hollow insulators 80F and 80R disposed on opposite sides of the plate assembly 41 in alignment with opposite ends of a clearance opening 80H in the plate assembly 41. A rigid rod 82 extends through each pair of insulators 80F and 80R, and nuts 82F and 82R on the rod 82 engage these insulators so as to clamp the same against opposite sides of the plate assembly 41. At their inner ends the rods 82 are bent toward each other as at 82A, and between the ends of the arms 82A, a sensing ring R is secured as by welding the ends of the arms 82A to opposite outside surfaces of the ring R at 83. The ring R is supported in such a relation that it will be enveloped in the outer border portions of the flame F as shown in Fig. 3, thereby to assure efficient electrical contact between the flame and the ring R. Just beyond the ring R, or to the right as viewed in Fig. 3, a wire mesh member 85 is supported in a normal relation to the axis of the burner 46 and is substantially centered upon such axis. The wire mesh member 85 is preferably square in form, and is of such width that the flame from the burner 45 may spread and pass about the wire mesh member 85. As herein shown, the wire mesh member 85 is supported on a bracket 86 that is welded at its rear end to one edge of the member 85 and is secured by screws 87 at its forward end to the rear face of the insulating plate 41P. The location of the mesh member 85 so that the gaseous fuel may pass about the edges thereof assures that combustion will take place on both sides of the wire mesh member, and the heating of the wire mesh member 85 is such that this member serves as a re-ignitor to insure that complete combustion of the fuel gas will take place.

It has been found that with the burner 45 constructed in the manner thus described, the supply of air to the burner is initially limited by the inlet end opening of the flow directing sleeve or tube 60 and this limiting control is attained even though the main stream of air through the passage 26 is moving quite rapidly. The primary air for supporting combustion that is thus limited in its initial volume, is then redistributed evenly within and throughout the inner burner tube 46 by virtue of the inlet openings 47, so that the combustion may progress and become well established within the tube 46, and this produces efficient combustion in the flame F as it is projected from the tube 46 and past the sensing ring R and the ignitor 85. With this arrangement the combustion is sustained even in the rapid current of air that passes the burner and hence efficient heating of such air is attained.

Figure 8:
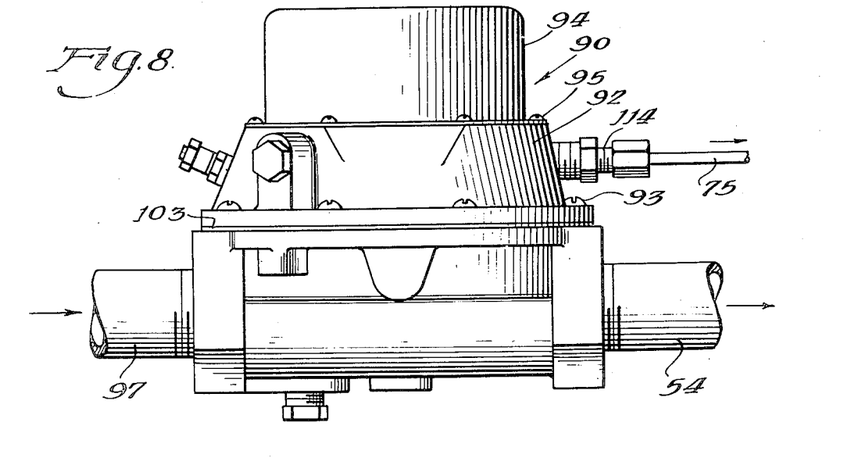
Fig. 8 is a side elevational view of one form of electrically controlled fuel valve that may be used.
Figure 9:
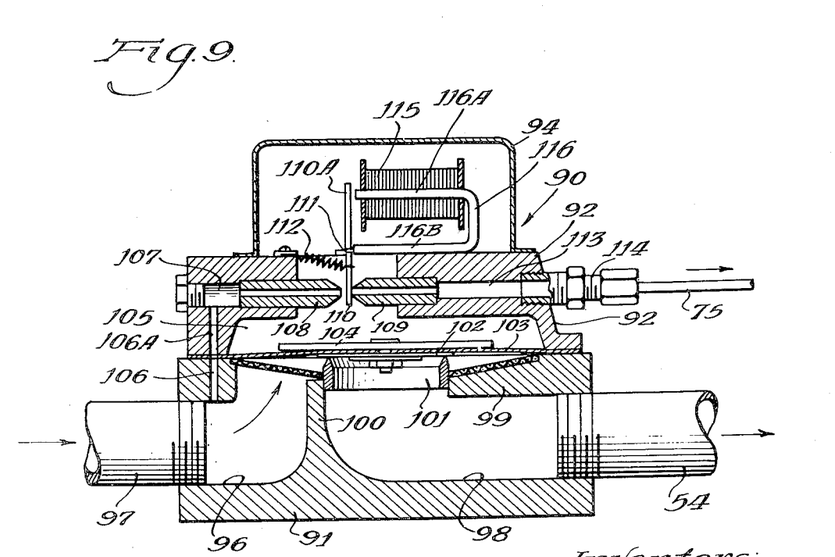
Fig. 9 is a somewhat diagrammatic vertical sectional view showing the valve of Fig. 8.

The supply of fuel gas to the burner 45 is governed by a sensitive control valve 90 which is of the construction shown in Figs. 8 and 9 of the drawings. This control is of a conventional construction in most respects and may be identified as a type B-60 gas valve made by General Controls Company of Glendale, California. This control valve 90 has a valve casing comprising a base casting 91, a head casting 92 secured in position on the base casting 91 by means such as screws 93, and a cap member 94 of an inverted cup-shaped form that is secured on the top of the head section 92 by means such as screws 95. The base casting 91 has an inlet 96 formed therein and a supply pipe 97 is threaded into this inlet. At the opposite edge of the base casting, an outlet 98 is afforded into which the pipe 54 is threaded so that the valve 90 is supported by the pipe 54 on the mounting plate assembly 41 and forms a part of the burner unit assembly 10. A horizontal web 99 and a vertical wall 100 formed in the base casting serve to afford a mounting for an annular valve seat member 101 that is disposed in the web 99 on a vertical axis. The upper edge of the valve seat member 101 is adapted to be engaged by a valve seat member 102 of disc-like form so as to thereby prevent flow of gas through the valve, and the valve member 102 is fixed on the lower face of a flexible diaphragm 103 that is clamped in a horizontal position between the upper face of the base casting 91 and the lower face of the head section 92. A relatively large disc 104 is secured on the upper face of the diaphragm 103 to serve as a weight which tends to close the valve. It will be evident, however, that the gas pressure in the inlet passage 96 tends to open the valve, or in other words, to actuate the diaphragm 103 so as to lift the valve member 102 off of its annular valve seat 101.

Under normal conditions, however, gas pressure is transmitted from the inlet 96 to a chamber 105 that is formed within the head casting 92, and thus the pressures on opposite sides of the diaphragm are equalized so that under the then dominating action of the weight 104, the valve member 102 assumes its lower or closed position. Thus, as will be evident in Fig. 9, a bleed passage 106 is formed from the inlet passage 96 so as to extend upwardly through the clamping edge portion of the diaphragm 103 and through a vertical passage 106A in the head section 92. The passage 106A communicates with a horizontal passage 107 in the head section 92 and the gas from the passage 107 is discharged into the chamber 105 through a nozzle 108 that is fitted into the horizontal passage 107.

It will be observed in Fig. 9 that another nozzle 109 is mounted horizontally and in alignment with the nozzle 108, and a flapper valve 110 is disposed between the two nozzles 108 and 109 for rocking movement on a horizontal axis 111 into closing engagement selectively with either of these two nozzles. An expansive spring 112 acting on the lower end portion of the flapper valve 110 normally tends to engage the flapper valve 110 with the vent nozzle 109, it being noted that the nozzle 109 communicates through a passage 113 and a fitting 114 with the vent pipe 75. Thus, since the nozzle 109 is thus normally closed, the gas pressure from the inlet 96 may build up a corresponding pressure on the upper side of the diaphragm, so as to cause the valve 102 to close. When the valve member 102 is to be moved into its open position, the flapper valve 110 is rocked in a clockwise direction so as to close the nozzle 108 and open the vent nozzle 109.

This serves to close the pressure equalizing passage from the gas inlet 96 and at the same time to open the vent nozzle 109 and thereby cause reduction of the gas pressure above the diaphragm 103. It will be observed that the gas that is thus vented is contained within the chamber 105 and within the cap 94, the interior of which communicates with the chamber 105, as will be evident in Fig. 9.

The operation of the flapper valve 110 requires but very little energy and this is accomplished magnetically through an operating coil 115. This operating coil is wound upon the upper arm 116A of a U-shaped core iron member 116, the lower arm 116B of which is in contact with the flapper member 110 at substantially the pivot 111. The upper end 110A of the flapper member is disposed opposite the end of the upper arm 116A of the core member so that when the operating coil 115 is energized, the flapper member 110 will be magnetically shifted in a clockwise direction from the position shown in Fig. 9 to a position where the nozzle 108 is closed and the nozzle 109 is open. As hereinabove pointed out, this valve structure is conventional in substantially every respect, the coil 115, however, being rewound in the present instance to match the same with an energizing control source as will presently be described.

The gas that is thus vented from the chamber 105 whenever the valve member 102 is open, represents a relatively small volume of fuel, and, in many instances, where valves such as the valve 90 are utilized, this small volume of fuel gas is merely vented to atmosphere. However, we prefer to vent this gas into the burner 45 and this is accomplished through the vent pipe 75 which is extended from the fitting 114 so as to terminate, as shown in Fig. 3, within the burner sleeve 46.

Figure 10:
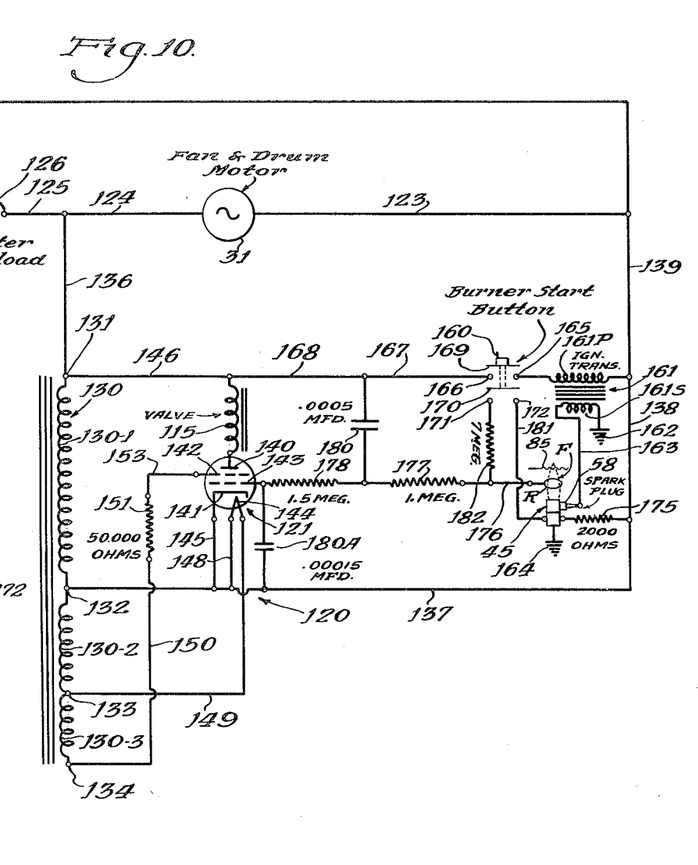
Fig. 10 is a schematic wiring diagram illustrating the control circuit of the present invention.

The operation of the fuel valve 90 is governed by a burner safety control system 120, Fig. 10, which includes an electron tube 121, and the power for the control system 120 as well as for the driving motor 31 is controlled by a common thermostatic switch means which operates to stop the cycle of operation of the machine upon completion of the drying cycle. Thus, in Fig. 10, a source of alternating current is afforded by wires L1 and L2, through an overload switch 126. The overload switch 126 is connected by a wire 127 to one terminal of a combination starting and thermostatic cut-out switch 128, the other terminal of which is connected to the wire L1. The combination starting and thermostatic switch 128 is of conventional construction and the thermostatic element thereof is mounted in association with the air outlet passage 29, Fig. 1, so as to open the switch 128 when the temperature of the outgoing air becomes unduly high due to completion of the drying action upon the clothes in the machine. Thus, when the machine is to be started, the switch 128 is closed so as to thereby start the motor 31, and the control system 120 is arranged to be supplied with power only during the time when the switch 128 remains closed.

The control system 120 includes means for affording the necessary power and bias for the electron tube 121, and in the present instance such means comprise an autotransformer 130 having sectional windings defined by terminals 131, 132, 133 and 134. The tube 121 and the transformer 130 are mounted on the forward face of the plate 41, thereby to form a part of the unit 10 which is assembled on the plate 41. The chassis 129 serves as an enclosure and mounting for the various electrical elements of the control circuit. The terminals 131 and 132 are disposed at opposite ends of a section 130—1 of the transformer winding, the terminals 132 and 133 are disposed at opposite ends of the winding section 130—2 while the terminals 133 and 134 are disposed at opposite ends of a section 130—3 of the transformer winding, such sections of the transformer winding being in series so that the terminals 131 and 134 are at opposite ends of the complete winding. The terminal 131 is connected by a wire 136 at the junction between the wires 124 and 125, while wires 137, 138, and 139, in a series, connect the terminal 132 with the line wire L2. Thus when the switch 128 is closed, the transformer winding is energized, and the line wires are connected so as to afford plate circuit power for the plate circuit of the electron tube 121, as will now be described. This electron tube 121 may take the form of a type 2D21 Thyratron, and this tube has an anode 140, a cathode 141, a shield grid 142, and a control grid 143. The tube also has a heater filament 144. The cathode 141 of the tube is connected by a wire 145 to the wire 137, while the anode or plate 140 is connected to one terminal of the operating coil 115 of the valve 90, the other terminal of this coil being connected by a wire 146 to the terminal 131 of the transformer 130. The operating coil 115 of the fuel valve 90 is thus included in the plate circuit of the tube 121, and the coil 115 will be energized whenever plate current flows in the plate circuit of the tube 121.

The energizing circuit for the filament 144 is afforded by connecting the same across the section 130—2 of the transformer, and for this purpose a wire 148 extends from the wire 137 to one terminal of the filament 144, while the other terminal thereof is connected by a wire 149 to the terminal 133.

The tube 121 is normally biased to a non-conductive state by bias voltage applied to the shield grid 142, and when the tube 121 is to be rendered conductive, an appropriate positive voltage is supplied to the control grid 143 as will hereinafter be described. In affording the desired negative or blocking bias for the shield grid 142, a wire 150, a resistance 151 and a wire 153 are extended in a series from the terminal 134 to the shield grid 142. Thus the negative voltage from the terminal 134 which is more negative at the critical time than the cathode voltage taken from the terminal 132, is applied to the shield grid 142 in what may be termed the positive cycles of the alternating current or, in other words, in those cycles when the plate 140 is positive with respect to the cathode 141, and the magnitude of the negative bias that is thus afforded is such that in the absence of an appreciable positive potential on the control grid 143, the tube 121 will be non-conductive. Moreover, even when the tube 121 is conductive, the most common failure that may occur in the tube, which failure involves burning out of the filament 144, will cause the tube to become non-conductive so as to result in what is usually termed a "safe failure."

When the switch 128 is closed so as to thereby start the motor 31, the burner operation is not initiated or started until a separate starting switch means in the form of a starting button 160 is operated. The starting button 160 is arranged as will hereinafter be pointed out to cause the tube 121 to become conductive, so as to thereby open the fuel valve 90 and also to cause the ignition means which include the spark plug 58 to be energized. Thus, in the form disclosed in Figs. 1 to 10, an ignition transformer 161 is mounted on the forward face of the plate 41 immediately beneath the spark plug 58. The transformer 161 has a secondary coil 161S and a primary coil 161P. The secondary coil 161S has one terminal grounded at 162 while the other terminal thereof is connected by a wire 163 to the spark plug 58. The other side of the spark plug 58 is, of course, grounded to the burner 46 and this ground connection is indicated in Fig. 10 at 164. The primary coil 161P has one terminal thereof connected to the wire 139, while the other terminal thereof is connected to a stationary switch contact 165 of the switch 160. A cooperating stationary contact 166 of the switch 160 is connected by wires 167 and 168 to the wire 146, and a conducting cross arm 169 on the switch 160 may thus be engaged with the contacts 165 and 166 to energize the ignition transformer 161. The switch 160 also has a second conducting cross bar 170 that may be engaged with stationary contacts 171 and 172 when the starting button 160 is pressed, and these contacts are effective, as will hereinafter be described, to apply positive voltage to the control grid 143 so as to thereby cause the fuel valve 90 to be opened. In attaining this action, the switch means afforded by the bar 170 and the contacts 171 and 172 completes a circuit which effectively simulates the presence of a flame at the burner 45, and for this reason the normal action of the control system will first be described.

The flame sensing ring R is arranged and associated with the electron tube 121 in such a way that when a flame is present so as to extend between the burner 45 and the flame sensing ring R, a positive voltage will be applied to the control grid 143 so as to render the tube 121 conductive. In attaining this result, the burner 45 is connected to the line wire L2 by a resistance 175 and the wires 138 and 139. The flame sensing ring R in turn has a wire 176 extended from one of the rods 82 to one end of a resistor 177, the other end of this resistor being connected to a resistor 178. The other end of the resistor 178 is connected to the control grid 143. At the juncture of the resistors 177 and 178, one terminal of a condenser 180 is connected at the juncture of the wires 167 and 168.

When a flame F extends between the burner 45 and the flame sensing ring R, a circuit is completed through the flame F and the resistance of the flame constitutes a circuit element of a circuit that extends from ground at 164, or cathode potential, to the wire 168 through the condenser 180. As will be hereinafter explained, this is effective during the forward or positive cycles to cause a positive voltage to be applied to the control grid 143. Through the use of electrical values in the circuit of the order hereinafter set forth, this voltage on the control 143 may be made effective to cause the tube 121 to become conductive. In the starting operation, this action is attained through the switch bar 170, the contact 172 being connected by a wire 181 to the burner 45 while the contact 171 is connected through a resistor 182 to the wire 176. A stabilizing condenser 180A is connected between the grid 143 and the wire 137 so as to produce uniformity of operation.

In setting up the control thus described, the following values for the various circuit elements have been found to be satisfactory:

| | |
|---|---|
| Condenser 180A | .00015 microfarad |
| Condenser 180 | .0005 microfarad |
| Resistance 151 | 50,000 ohms |
| Resistance 178 | 1.5 megohms |
| Resistance 177 | 1.0 megohm |
| Resistance 175 | 2,000 ohms |
| Resistance 182 | 7 megohms |

When dryer is to be started, the start switch 128 is moved to its closed and latched position so as to thereby start the motor 31 and energize the transformer 130. The connections from the transformer section 130-2 serve to heat the cathode 141, while the negative bias applied to the screen grid 142 serves to block the tube 121 and prevent flow of plate current therein. In this respect it should be noted that prior to the starting or ignition of the burner 45, the only power connection to the control grid 143 is through the condenser 180 and the resistor 178 from the side of the transformer winding that is connected to the anode. Under such circumstances there is no current flow through the condenser 180, for although one side of the condenser is connected to the same terminal of the transformer 130 as the anode 140, the other side of the condenser 180 may be said to be floating because all of the circuit branches from such other side of the condenser 180 are at this time in an open circuit relation. Thus the switch bar 170 of the start switch is in an open relation, while the branch through the flame sensing ring R is open due to the lack of a flame F. The other branch circuit through the resistor 178 to the control grid 143 is also open, since the tube is blocked by the highly negative shield grid bias, so that there is no flow of cathode-grid current. Moreover, the impedance of the stabilizing condenser 180A is high so that there is no current flow therethrough and the effect is the same as an open circuit at this point. Thus, although one side of the condenser 180 is connected so as to be positive in those half cycles when the anode or plate is positive, the lack of current flow, or the extremely small current flow across the condenser 180 in such forward half cycles, assures that positive grid bias will not be applied to the control grid at this time.

As a result of this circuit arrangement, the tube 120 remains non-conductive until such time as the start button 160 is actuated. This, of course, operates the ignition means so as to produce igniting action at the spark plug 58, and in addition, a circuit is closed from the ground side of the line through the resistors 187 and 177 and the condenser 180 to the hot side of the line. In this respect it may be noted that the value of the resistor 182 is such as to simulate the resistance of a flame between the burner 45 and the sensing ring R, and hence the effect on the bias of the control grid 143 is the same as when a flame is sensed. Thus the circuit that is established between the line wires L1 and L2 includes the condenser 180, the resistance 177, and the flame-simulating resistance 182, and this circuit acts as a voltage divider from which the control grid bias is tapped through the limiting resistor 178. The point at which the control grid is thus tapped is such that the grid 143 is rendered sufficiently positive to cause firing of the tube 121 throughout a substantial portion of each forward cycle so long as the resistance in the voltage dividing circuit is kept within a certain range.

When the firing of the tube 121 in response to operation of the start button 166 has caused opening of the fuel valve 115, and the fuel fed to the burner 45 has been ignited, the presence of a flame F will be sensed by the sensing ring R. This completes a circuit that is in parallel with the resistor 182 and which includes the resistance of the flame F and at this time the start button 166 may be released so as to place the system under sole control of the flame sensing means. The flame resistance has been found to vary from about two to seventy megohms, and throughout this range, the voltage dividing network will be effective to maintain a firing bias on the control grid 143. If, however, the flame F is extinguished, or if the sensing ring R becomes grounded, the positive bias voltage on the control grid 143 will be reduced or changed in such a way as to enable the negative bias of the shield grid 142 to regain control and render the tube 121 non-conductive.

In the case of a grounding of the sensing ring, the resistance at the flame gap is reduced to zero so that the effective position of the control grid tap will be so changed in an electrical sense as to reduce the control grid bias to such a point that it is below the positive value required to fire the tube, and hence the shield grid 142 will regain control in the next inverse cycle.

Flame failure will of course return the system to its original condition insofar as biasing voltage on the control grid 143 is concerned, and hence the shield grid will resume control, and the tube will become non-conductive. In either event, the valve 115 will be de-energized, and will close so as to shut off the supply of fuel to the burner 45.

Figure 11:
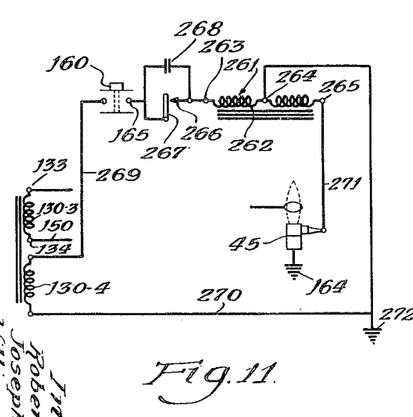
Fig. 11 is a fragmentary wiring diagram showing another form of ignition means.

In Fig. 11 of the drawings an alternative form of ignition means has been illustrated whereby the use of a relatively expensive ignition transformer 161 may be avoided and in this embodiment of the invention a spark coil 261 of substantially conventional construction is utilized. The spark coil 261 is auto-wound to afford a winding 262 having terminals 263, 264 and 265, and a contact 266 extended from the terminal 263 has a vibrating armature contact 267 associated therewith to act in the usual manner as a periodic circuit breaking means. The contacts 266 and 267 have a condenser 268 connected thereacross, and the contact 267 is connected to the contact 165 of the start switch 160. The other contact 169, instead of being connected to the wire 167, is connected by a wire 269 to the wire 150, and another and separate winding section 130—4 that is afforded in the transformer 130 to afford the usual 6-volt source for the spark coil 261. A wire 270 extends from the other end of the winding 130—4 to the tap 264 on the spark coil winding. The section of the spark coil winding between the taps 264 and 265 constitutes the secondary, and the tap 265 is connected by a wire 271 to the spark plug 56 while the tap 264 is grounded at 272. With the structure thus afforded, the required ignition means functions in a highly satisfactory manner, and yet may be provided at a reasonable cost.

The values specified hereinabove for the circuit elements are of course what we consider to be optimum values, but it will be recognized that such values may vary within certain limits while still producing safe operation of the burner. Thus the condenser 180 may be varied between about .0003 and .0007 microfarad, while the condenser 180A may be varied between about .000075 and .0002 microfarad. Similarly, the total value of the resistances 177 and 178 may be varied between one and five megohms, and if desired, the resistances 178 and 177 may be combined and placed between the condenser 180 and the control grid 143. When this is done, the flame constitutes the sole resistance for cooperation in series with the condenser 180 in affording the voltage dividing network from which the control grid voltage is tapped.

From the foregoing description it will be evident that the present invention enables a gas burner to be safely utilized in a rapidly moving current of air such as the air that is forced through a clothes drier or the like, and this is accomplished through the use of structure that is extremely simple in character. Moreover, it will be evident that the present invention affords a burner and control assembly of a simple character that may be easily and economically manufactured and serviced.

Thus, while we have illustrated and described the preferred embodiments of our invention, it is to be understood that this is capable of variation and modification and we therefore do not wish to be limited to the precise details set forth, but desire to avail ourselves of such changes and alterations as fall within the purview of the following claims.

We claim:

1. In a burner and control unit for heating air moving longitudinally through an elongated passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a supply line for said fitting extended through said plate, a control valve connected to and supported by said supply line adjacent the outer side of said plate, a spark plug mounted on said burner tube structure and having the power supply end thereof extended through said plate, a flame sensing element mounted on the inner side of said plate in alignment with but spaced from the front end of said burner structure and positioned so as to be enveloped in a flame issuing from said burner structure, a re-ignitor comprising a metallic screen mounted on said inner side of said plate in beyond said sensing element and in position to be enveloped by such a flame, and control means mounted on the outer side of said plate and operatively associated with said sensing element and said valve for controlling the opening and closing of said valve in accordance with the sensing action of said sensing element.

2. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a supply line for said fitting extended through said plate, a control valve connected to and supported by said supply line adjacent the outer side of said plate, a spark plug mounted on said burner tube structure and having the power supply end thereof extended through said plate, a flame sensing element mounted on the inner side of said plate in alignment with but spaced from the front end of said burner structure and positioned so as to be enveloped in a flame issuing from said burner structure, a re-ignitor comprising a screen mounted on said inner side of said plate in beyond said sensing element and in position to be enveloped by such a flame, control means mounted on the outer side of said plate and operatively associated with said sensing element and said valve for controlling the opening and closing of said valve in accordance with the sensing action of said sensing element, normally inoperative power supply means for said spark plug, and a start element adapted to be moved to a start position and adapted to govern said control means to open said valve and also to cause operation of said power supply means for said spark plug.

3. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a supply line for said fitting extended through said plate, a control valve connected to and supported by said supply line adjacent the outer side of said plate, an electrically operated ignition means associated with said burner tube structure and having the power supply end thereof extended through said plate, a flame sensing element mounted on the inner side of said plate in alignment with but spaced from the front end of said burner structure and positioned so as to be enveloped in a flame issuing from said burner structure, and control means mounted on the outer side of said plate and operatively associated with said sensing element and said valve for controlling the opening and closing of said valve in accordance with the sensing action of said sensing element.

4. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a supply line for said fitting extended through said plate, a control valve connected to and supported by said supply line adjacent the outer side of said plate, a flame sensing element mounted on the inner side of said plate in alignment with but spaced from the front end of said burner structure and positioned so as to be enveloped in a flame issuing from said burner structure, and control means mounted on the outer side of said plate and operatively associated with said sensing element and said valve for controlling the opening and closing of said valve in accordance with the sensing action of said sensing element.

5. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a gas supply line for said fitting extended through said plate, a control valve connected to and supported by said supply line adjacent the outer side of said plate, and a flame sensing element mounted on the inner side of said plate in alignment with but spaced from the front end of said burner structure and positioned so as to be enveloped in a flame issuing from said burner structure.

6. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, a gas inlet fitting mounted on the rear end of said burner tube structure for supplying gaseous fuel thereto, a gas supply line for said fitting extended through said plate, a control valve connected to and supported by said supply line adjacent the outer side of said plate, a flame sensing element mounted on the inner side of said plate in alignment with but spaced from the front end of said burner structure and positioned so as to be enveloped in a flame issuing from said burner structure, and ignition means mounted in part on the outer side of said plate and having spark gap elements operatively associated with said burner structure on the inner side of said plate.

7. In a burner and control unit for heating air moving through a longitudinal passage, a mounting plate having inner and outer sides and adapted to be put in position over an opening in the side of such a passage, an elongated burner tube structure having front and rear ends and supported on said plate opposite and in spaced parallel relation to said inner side thereof, said burner tube structure having air inlet openings in said rear end thereof for admitting a controlled volume of air from the air moving through such a passage, a gas inlet fitting mounted on the rear end of said burner tube structure for supplying gaseous fuel thereto, a supply line for said fitting extended through said plate, a control valve connected to and supported by said supply line adjacent the outer side of said plate, and a flame sensing element mounted on the inner side of said plate in alignment with but spaced from the front end of said burner structure and positioned so as to be enveloped in a flame issuing from said burner structure.

ROBERT E. YATES.
JOSEPH M. ENGEL.
WILLIAM W. RIESCHE.

REFERENCES CITED

The following references are of record in the file of this patent:

UNITED STATES PATENTS

| Number | Name | Date |
|---|---|---|
| 316,059 | Randol | Apr. 21, 1885 |
| 1,393,280 | Good | Oct. 11, 1921 |
| 1,863,391 | Bluemel | June 14, 1932 |
| 2,131,221 | Crary | Sept. 27, 1938 |
| 2,304,200 | Plein et al. | Dec. 8, 1942 |
| 2,412,990 | Kruse | Dec. 24, 1946 |